United States Patent
Kobori

(10) Patent No.: US 12,106,643 B2
(45) Date of Patent: Oct. 1, 2024

(54) SECURITY SYSTEM, SECURITY METHOD, AND NON-TRANSITORY COMPUTER-READABLE STORAGE MEDIUM STORING SECURITY PROGRAM

(71) Applicant: TOYOTA JIDOSHA KABUSHIKI KAISHA, Toyota (JP)

(72) Inventor: Norimasa Kobori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 18/074,761

(22) Filed: Dec. 5, 2022

(65) Prior Publication Data

US 2023/0186741 A1    Jun. 15, 2023

(30) Foreign Application Priority Data

Dec. 10, 2021 (JP) .................................. 2021-201005

(51) Int. Cl.
| | |
|---|---|
| *G06K 9/62* | (2022.01) |
| *G06T 7/20* | (2017.01) |
| *G06V 10/25* | (2022.01) |
| *G06V 10/26* | (2022.01) |
| *G06V 10/82* | (2022.01) |

(Continued)

(52) U.S. Cl.
CPC .......... *G08B 13/19613* (2013.01); *G06T 7/20* (2013.01); *G06V 10/25* (2022.01); *G06V 10/26* (2022.01); *G06V 10/82* (2022.01); *G06V 20/52* (2022.01); *G06V 40/20* (2022.01);

(Continued)

(58) Field of Classification Search
CPC ........ G08B 13/19613; G08B 13/19608; G08B 31/00; G06T 7/20; G06T 2207/30196; G06T 2207/30232; G06V 10/25; G06V 10/26; G06V 10/82; G06V 20/52; G06V 40/20; G06V 10/16; G06V 10/62; G06V 20/53; G06V 10/751; G06V 10/96; G06V 40/103; H04N 7/181
See application file for complete search history.

(56) References Cited

U.S. PATENT DOCUMENTS

| | | | |
|---|---|---|---|
| 2017/0053191 A1* | 2/2017 | Koyama | .............. G06V 40/173 |
| 2021/0074135 A1* | 3/2021 | Eswara | .............. G06F 21/6254 |

(Continued)

FOREIGN PATENT DOCUMENTS

| | | |
|---|---|---|
| JP | 2009-225398 A | 10/2009 |
| JP | 2017-062633 A | 3/2017 |

(Continued)

*Primary Examiner* — Howard D Brown, Jr.
(74) *Attorney, Agent, or Firm* — Oliff PLC

(57) ABSTRACT

A security system monitors a behavior of a person included in a plurality of camera images captured continuously in time series by a surveillance camera. The security system performs tracking processing of detecting each person region of a person included in a plurality of camera images, and identifying a person included in the plurality of camera images in time series based on person image data included in the person region. When the identification by the tracking processing transitions to failure in the middle, it is determined that a person having suspicious behavior is included in the camera image. When it is determined that the suspicious behavior is included, alert information may be notified from an output device.

15 Claims, 6 Drawing Sheets

(51) Int. Cl.
*G06V 20/52* (2022.01)
*G06V 40/20* (2022.01)
*G08B 13/196* (2006.01)

(52) U.S. Cl.
CPC ............... *G08B 13/19608* (2013.01); *G06T 2207/30196* (2013.01); *G06T 2207/30232* (2013.01)

(56) References Cited

U.S. PATENT DOCUMENTS

| | | | | |
|---|---|---|---|---|
| 2021/0174094 | A1* | 6/2021 | Oami | ............... G08B 13/19608 |
| 2021/0307621 | A1* | 10/2021 | Svenson | ................ A61B 5/015 |
| 2021/0390807 | A1* | 12/2021 | Chaurasia | ................ G07C 9/27 |
| 2022/0189264 | A1 | 6/2022 | Oami | |

FOREIGN PATENT DOCUMENTS

| | | |
|---|---|---|
| JP | 2018-093423 A | 6/2018 |
| JP | 2019-121904 A | 7/2019 |
| JP | 2020-088687 A | 6/2020 |
| JP | 2021-087031 A | 6/2021 |
| WO | 2015/166612 A1 | 11/2015 |
| WO | 2020/195376 A1 | 10/2020 |

\* cited by examiner

BOX1  IMG1

SECURITY SYSTEM, SECURITY METHOD, AND NON-TRANSITORY COMPUTER-READABLE STORAGE MEDIUM STORING SECURITY PROGRAM

CROSS-REFERENCE TO RELATED APPLICATION

The present application claims priority under 35 U.S.C. § 119 to Japanese Patent Application No. 2021-201005, filed Dec. 10, 2021, the contents of which application are incorporated herein by reference in their entirety.

BACKGROUND

Field

The present disclosure relates to a technique of a security system, a security method, and a security program for identifying suspicious behavior of a person included in a camera image.

Background

JP2009-225398A disclose a technology related to an image distribution system that distributes images captured by surveillance cameras and the like. The image distribution system according to this technique includes a camera and a distribution device. The distribution device includes a personal authentication database. The distribution device refers to the personal authentication database using the data of the camera image to identify a person, for example, a child, who appears in the camera. The data of the specified person is transmitted to a receiving device via the network together with the data of the camera image.

SUMMARY

It is considered that a camera image of a person captured by a surveillance camera, or the like is used for crime prevention. A camera image captured by a surveillance camera, or the like may include a person performing a suspicious behavior. One example of suspicious behavior is an activity of suddenly changing the appearance of clothes or the like in order to avoid tracking. If such a suspicious behavior can be identified from a camera image captured by a surveillance camera, it can be used for crime prevention.

The present disclosure has been made in view of the above-described problem, and an object thereof is to provide a technique capable of specifying suspicious behavior of a person captured by a surveillance camera.

In order to achieve the above-described object, the present disclosure provides a security system that monitors a behavior of a person included in a plurality of camera images captured continuously in time series by a surveillance camera. The security system includes a memory configured to store the plurality of camera images and a processor configured to process the plurality of camera images stored in the memory. The processor is configured to execute tracking processing of detecting each person region of a person included in the plurality of camera images and identifying a person included in the plurality of camera images in time series based on person image data included in the person region, and suspicious behavior determination processing of determining that a person having suspicious behavior is included in the camera image in a case where identification by the tracking processing transitions to failure in the middle.

In the security system according to the present disclosure, the plurality of camera images may include a first camera image and a second camera image subsequent to the first camera image, template image data including person image data of the person region of the first camera image may be stored in the memory, and the tracking processing may be configured to identify a person in the second camera image by comparing person image data included in the person region of the second camera image with the template image data using a neural network model.

In the security system according to the present disclosure, the processor may be configured to execute, when occlusion occurs in the person region, prohibiting the suspicious behavior determination processing for the person region in which the occlusion occurs.

In the security system according to the present disclosure, the processor may be configured to execute prohibiting the suspicious behavior determination processing when the identification by the tracking processing transitions to failure in the middle and the identification by the tracking processing has not been continued for a predetermined time before the failure.

In the security system according to the present disclosure, the processor may be configured to further execute a notification processing of notifying alert information from an output device when it is determined that the person having the suspicious behavior is included in the camera image.

In addition, in order to achieve the above object, the present disclosure is applied to a security method in which a computer performs monitoring a behavior of a person included in a plurality of camera images captured continuously in time series by a surveillance camera. The security method includes detecting each person region of a person included in the plurality of camera images, performing tracking processing for identifying a person included in the plurality of camera images in time series based on person image data included in the person region, and determining that a person having suspicious behavior is included in the camera image when the identification by the tracking processing transitions to failure in the middle.

In addition, in order to achieve the above object, the present disclosure is applied to a non-transitory computer-readable storage medium storing a security program for causing a computer to execute monitoring of behavior of a person included in a plurality of camera images continuously captured by a surveillance camera along a time series. The security program is configured to cause the computer to execute detecting each person region of a person included in the plurality of camera images, performing tracking processing for identifying a person included in the plurality of camera images in time series based on person image data included in the person region, and determining that a person having suspicious behavior is included in the camera image when the identification by the tracking processing transitions to failure in the middle.

According to the technology of the present disclosure, it is possible to identify suspicious behavior included in camera images of one or a plurality of surveillance cameras. Accordingly, it is possible to use camera images of one or a plurality of surveillance cameras for crime prevention.

DETAILED DESCRIPTION

Hereinafter, embodiments of the present disclosure will be described with reference to the drawings. However, in the embodiments described below, when a number such as the number, quantity, amount, range, or the like of each element is mentioned, the technical idea according to the present disclosure is not limited to the mentioned number unless otherwise specified or unless it is clearly specified to the number in principle.

Embodiment

1. Overview of Security System

Figure 1:
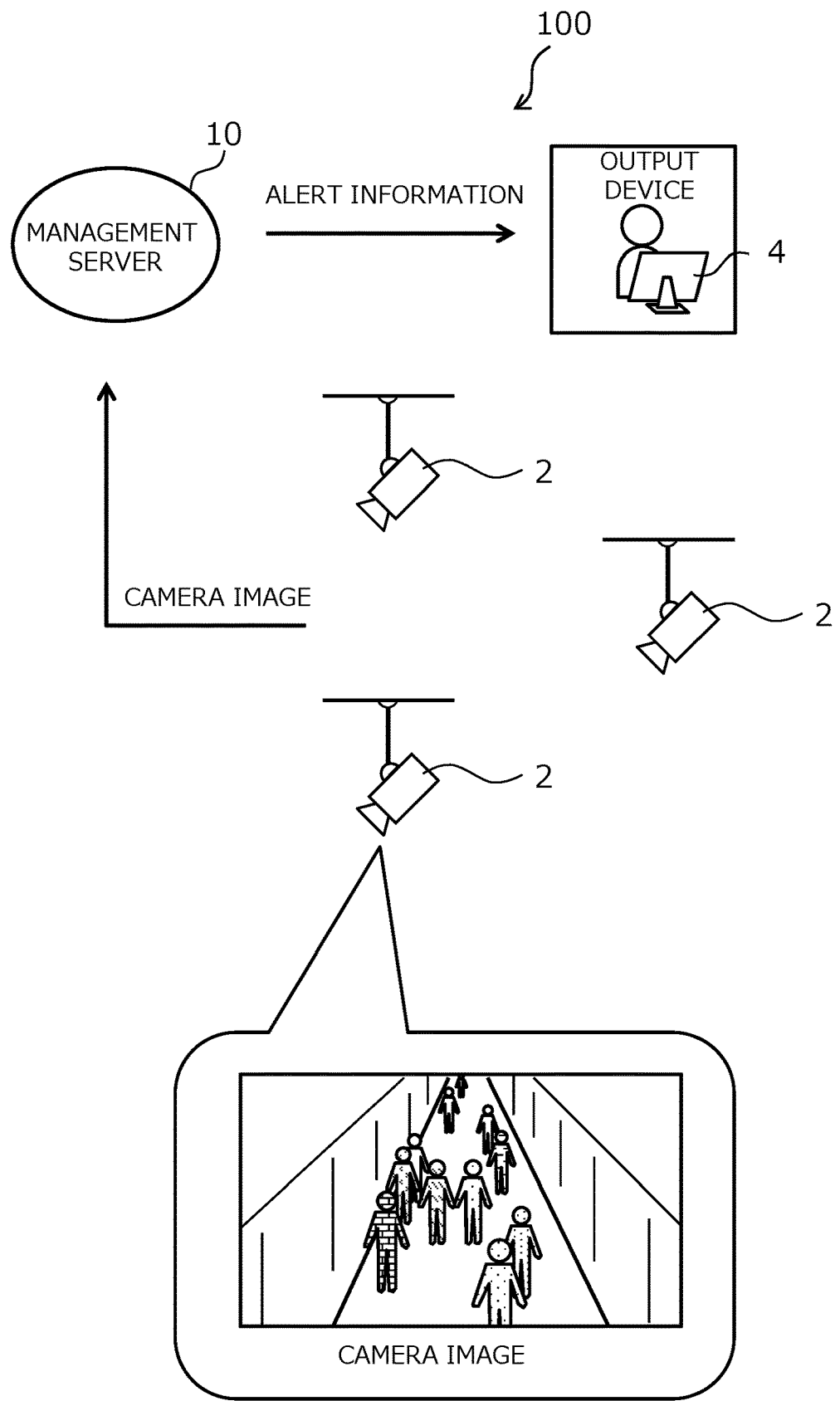
FIG. 1 is a configuration diagram of a security system according to an embodiment of the present disclosure.

FIG. 1 is a configuration diagram of a security system according to an embodiment of the present disclosure. A security system 100 specifies a suspicious person from camera images of one or more surveillance cameras. Here, the suspicious person is a person who has performed a suspicious behavior of changing appearance such as clothes in a public place where the surveillance camera is installed.

The security system 100 includes one or more surveillance cameras 2, an output device 4 that can be viewed by an administrator, and a management server 10. The one or more surveillance cameras 2 are installed in places where people pass, such as commercial facilities or outdoor public passages. The one or more surveillance cameras 2 continuously image passing people along a time series. The type, number, and installation location of the surveillance camera 2 are not limited. FIG. 1 illustrates an example of a camera image captured by the surveillance camera 2 that captures images of people passing through a passage. The camera images captured by the one or more surveillance cameras 2 are transmitted to the management server 10. The management server 10 may be directly connected to the one or more surveillance cameras 2, or may be connected to the one or more surveillance cameras 2 from a remote place via a communication network.

The management server 10 receives camera images captured continuously in time series by the one or more surveillance cameras 2, and executes a "tracking processing" of tracking a person in the camera images. For example, a technique called Person Re-Identification is used for the tracking processing. In the Person Re-Identification, first, a person region in which a person is present is detected from an input camera image. Image information of the person included in the detected person region is hereinafter referred to as "person image data". The detected person image data is input as a search query to a neural network model for the Person Re-Identification.

Template image data of a candidate destination is input to the neural network model. The template image data is data in which an ID for identification is associated with the person image data identified in a past camera image. In the neural network model, candidate template image data having the highest similarity to the person image data input as a search query is output as an output result. When there is no candidate template image data similar to the person image data, data in which a new identification ID is associated with the person image data is stored as a part of the new template image data. The management server 10 performs tracking processing by the Person Re-Identification on each of the input camera images along the time series, and identifies a person along the time series.

Here, the identification of the person image data by the tracking processing may transition to failure in the middle of the process. When the failure of the tracking processing frequently occurs, first, the reliability of the tracking process may have decreased. Such a situation may occur, for example, when an inappropriate image is stored as the candidate template image data, when the camera image is unclear, or when a person has an appearance that is difficult to identify. The management server 10 is configured to be able to execute a "reliability determination processing" of determining whether the reliability of the tracking processing has decreased. In the reliability determination processing, it is determined whether the tracking processing for the target person image data has been continued without failure for a predetermined time.

When occlusion occurs in the tracking processing, the tracking processing may fail. Here, the occlusion indicates a situation in which the person in the person region cannot be correctly recognized due to another target overlapping on the foreground side of the person in the person region. The management server 10 is configured to be able to execute "occlusion detection processing" for detecting the occurrence of occlusion in tracking processing of target person image data. In the occlusion detection processing, for example, when the ratio of the foreground region of the person image to the bounding box of the person region falls below a predetermined ratio, it is determined that occlusion has occurred.

Furthermore, when the appearance of a person suddenly changes during the tracking processing, the tracking processing may transition to failure. Such a situation may occur, for example, when a suspicious person disguises to avoid tracking.

Based on the above, in the security system 100 according to the present embodiment, in a situation in which the tracking processing for the target person has executed with high reliability and occlusion has not occurred, when the tracking process transitions to failure, it is determined that the target person has performed the appearance change which is a suspicious behavior. This processing is hereinafter referred to as "suspicious behavior determination processing".

When it is determined that the target person has performed a suspicious behavior, the management server 10 outputs alert information from the output device 4 via the communication network. This processing is hereinafter referred to as a "notification processing". Examples of the output device 4 include a monitor in a monitoring room that displays an image of the surveillance camera 2, or a mobile terminal of a monitoring person. Examples of the alert information include display of a message for calling attention to the suspicious behavior, voice notification, and the like.

According to the security system 100 as described above, it is possible to identify suspicious behavior included in camera images of one or more surveillance cameras 2. Thus, the camera images of one or more surveillance cameras 2 can be used for crime prevention.

2. Configuration of Security System

Figure 2:
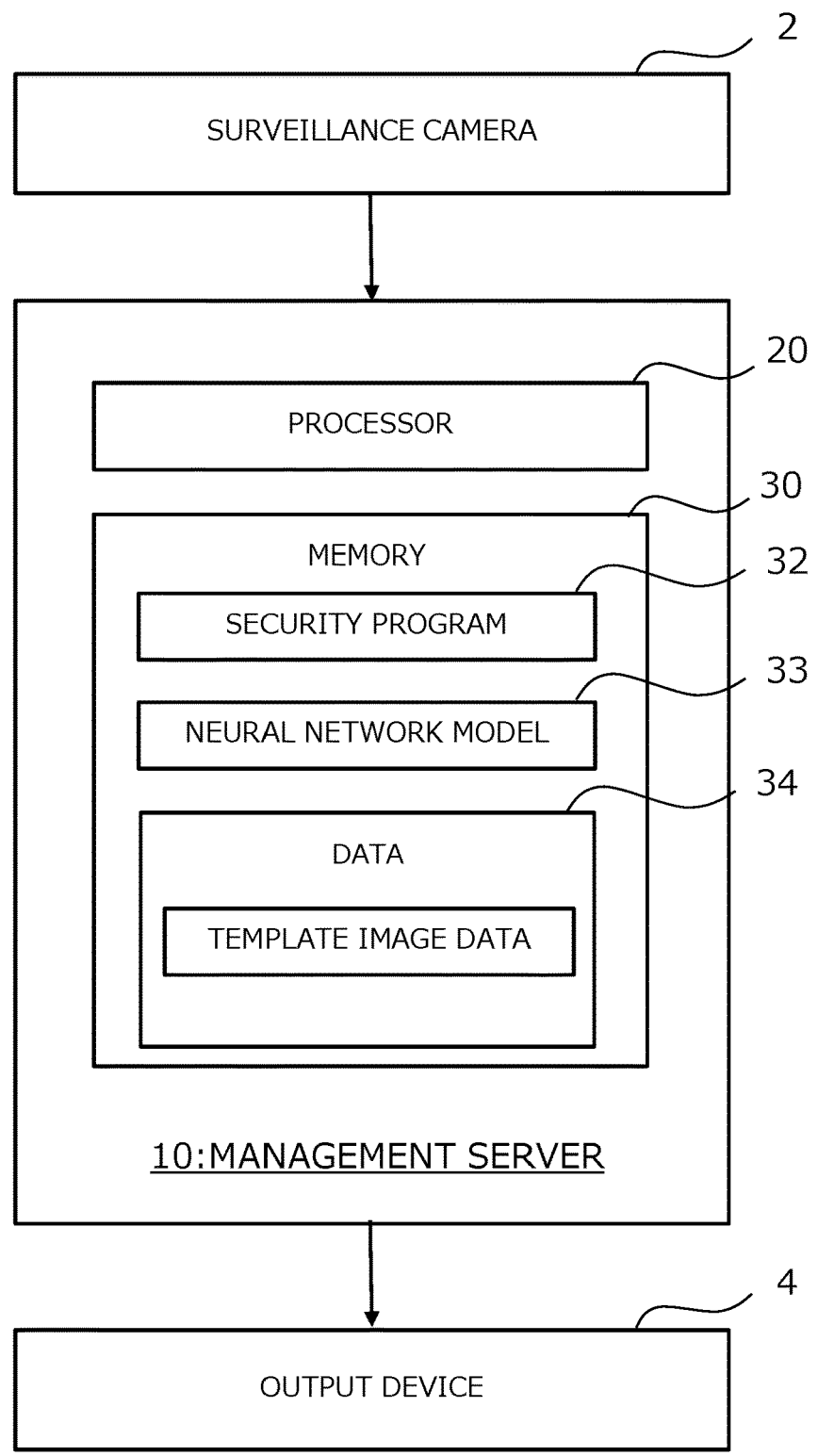
FIG. 2 is a block diagram showing an example of the configuration of the security system.

FIG. 2 is a block diagram showing an example of the configuration of the security system. The security system 100 includes the one or more surveillance cameras 2, the management server 10, and the output device 4.

The management server 10 has a function of a processing device as a computer. Typically, the management server 10 includes one or more processors 20 (hereinafter simply referred to as processor 20) and one or more memories 30 (hereinafter simply referred to as memory 30) coupled to the processor 20. The memory 30 stores one or more security programs 32 (hereinafter simply referred to as security program 32) executable by the processor 20, a neural network model 33, and various related data 34.

Figure 3:
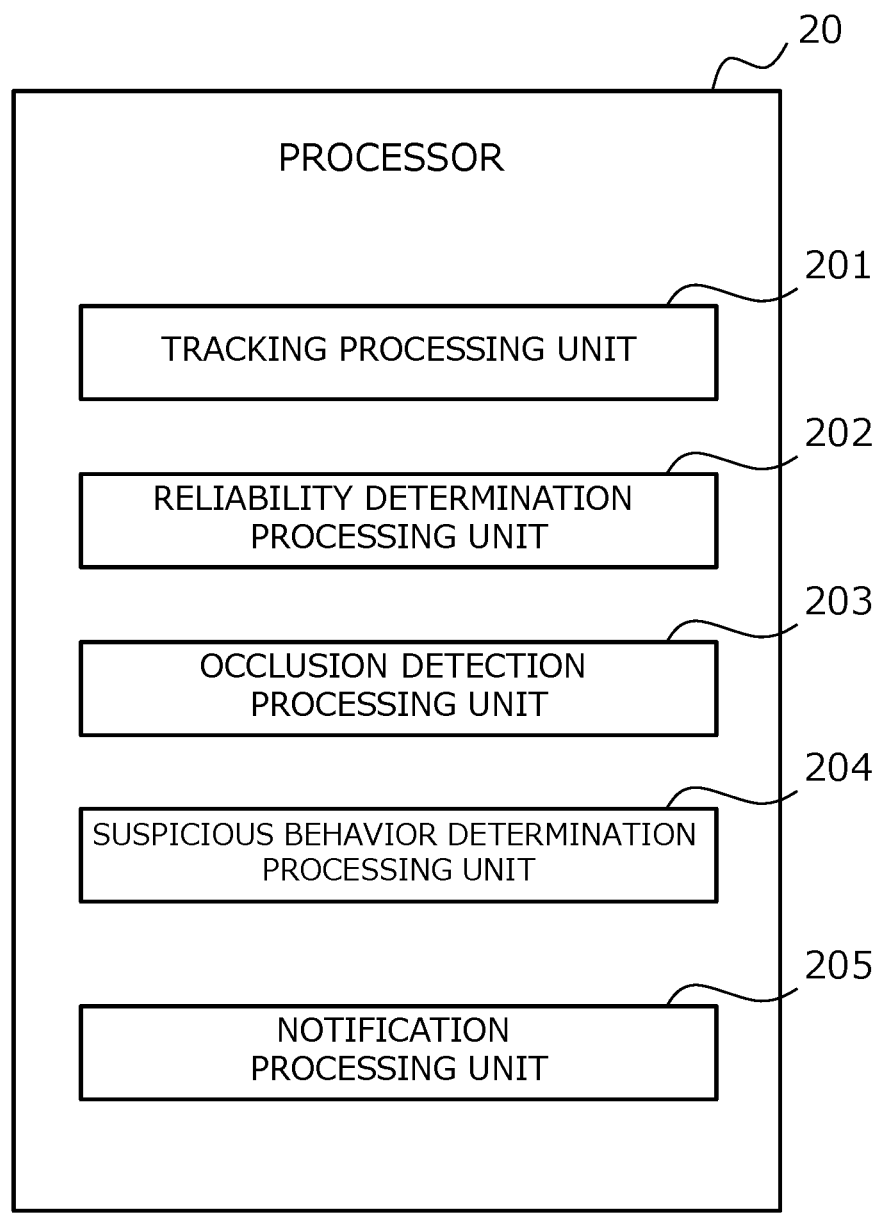
FIG. 3 is a block diagram showing functions realized by a processor of a management server executing a security program.

When the processor 20 executes the security program 32, various processes by the processor 20 are realized. FIG. 3 is a block diagram showing functions realized by the processor 20 of the management server 10 executing the security program 32. As illustrated in FIG. 3, the processor 20 includes a tracking processing unit 201 for performing the tracking processing, a reliability determination processing unit 202 for performing the reliability determination processing, an occlusion detection processing unit 203 for performing the occlusion detection processing, a suspicious behavior determination processing unit 204 for determining suspicious behavior included in a camera image, and a notification processing unit 205 for performing the notification processing. Hereinafter, the function of the processor 20 will be described also with reference to FIG. 1.

Figure 4:
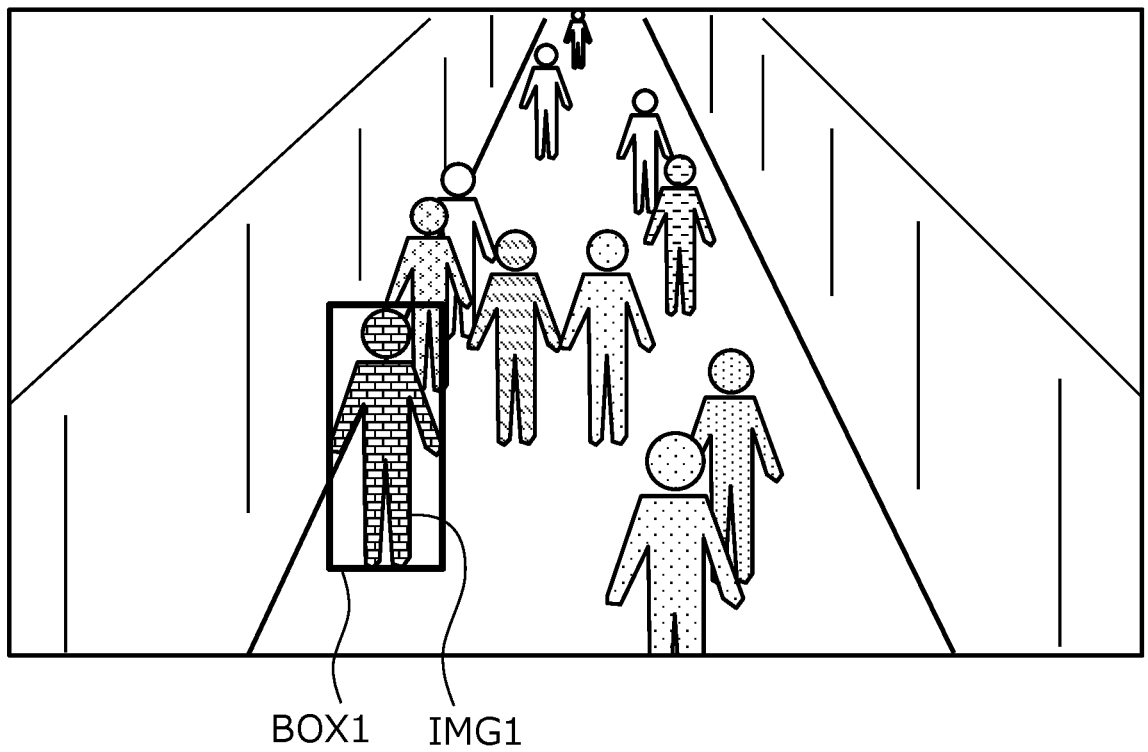
FIG. 4 is a diagram in which a person region of a person image IMG1 detected from a camera image is represented by a bounding box BOX1.

The tracking processing unit 201 is a functional block for performing the tracking processing based on Person Re-Identification. The tracking processing unit 201 detects person image data from a camera image captured by the surveillance camera 2. In FIG. 4, the person region of a person image IMG1 detected from the camera image is represented by a bounding box BOX1. Since a known technique can be applied to a method of detecting person image data from a camera image, a description thereof will be omitted.

Figure 5:
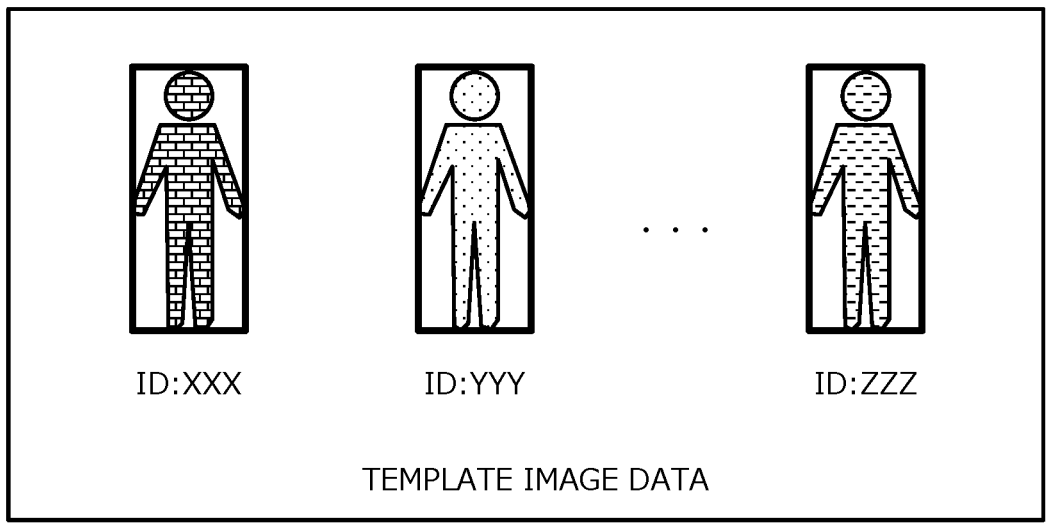
FIG. 5 is a diagram illustrating an example of a database of template image data.

A database of template image data is stored in the data 34 of the memory 30. FIG. 5 is a diagram illustrating an example of a database of template image data. In the template image data, an ID for identification is associated with each person image data identified from a past camera image. The tracking processing unit 201 includes a neural network model 33 for Person Re-Identification. The neural network model 33 collates the person image data with a database of template image data stored in the memory 30, and searches for a person of the template image data of the same person as the person image data according to the degree of similarity. When there is no template image data having a high degree of similarity to the person image data, the person image data is registered in the database as new person image data after being associated with an ID for identification. The tracking processing unit 201 tracks a person included in a camera image by sequentially performing the above-described processing on a plurality of camera images that are continuous in time series.

For example, when the plurality of camera images includes a first camera image and a second camera image subsequent to the first camera image, the person image data of the person region included in the second camera image is compared with the template image data in the tracking is compared with the template image data. The template image data at this time includes at least person image data of a person region included in the first camera image. Therefore, in the tracking processing for the second camera image, identification with the person image data of the person region included in the first camera image is possible, and thus tracking of the person along the time series is possible. Since a known model for person re-Identification can be applied to the neural network model 33 used in the tracking processing, a detailed description thereof will be omitted.

The reliability determination processing unit 202 is a functional block for performing the reliability determination processing. In the reliability determination processing, when the tracking processing for the person image to be a target transitions into failure, it is determined whether the tracking processing before transitioning into failure has been continued in a state of high reliability. Here, the index of the reliability is a duration time during which the tracking processing for the person image to be a target is continued without failure. The reliability determination processing unit 202 calculates a duration time Tc before failure of the tracking processing for the person image to be a target, and compares the duration time Tc with a predetermined time Tth. The predetermined time Tth is a value set in advance as a threshold value for determining whether the reliability of the determination process is high. When the duration time Tc is longer than the predetermined time Tth, the reliability determination processing unit 202 determines that the tracking processing has been continued in a state of high reliability.

Figure 6:
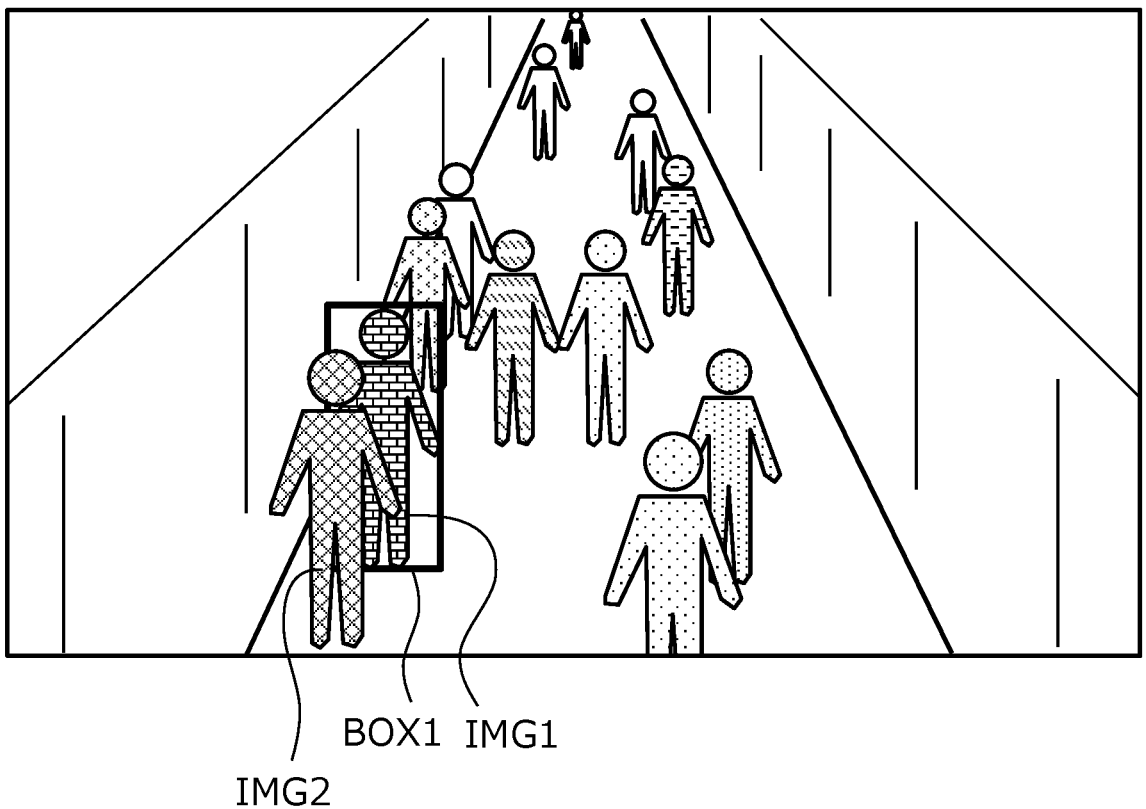
FIG. 6 is a diagram for explaining occlusion detection processing.

The occlusion detection processing unit 203 is a functional block for performing the occlusion detection processing. FIG. 6 is a diagram for explaining the occlusion detection processing. In the example shown in FIG. 6, the foreground side of the person region of the person image IMG1 surrounded by the bounding box BOX1 is overlapped with a part of another person image IMG2. In the occlusion detection processing, the occlusion detection processing unit 203 calculates a ratio R of the foreground side area of the person image IMG1 to the bounding box BOX1. When the calculated ratio R is larger than a predetermined ratio Rth, the occlusion detection processing unit 203 determines that occlusion has occurred.

The suspicious behavior determination processing unit 204 is a functional block for executing the suspicious behavior determination processing. In the suspicious behavior determination processing, the suspicious behavior determination processing unit 204 determines that the person of the target person image data has a suspicious behavior when the tracking processing has failed, it is determined in the reliability determination processing that the reliability is high, and occurrence of occlusion is not detected in the occlusion detection processing.

The notification processing unit 205 is a functional block for performing the notification processing. In the notification processing, when it is recognized that there is a suspicious behavior in the suspicious behavior determination processing, the notification processing unit 205 outputs alert information from the output device 4. The form of output to the output device 4 is not limited. For example, the output form may be a voice output for calling attention from a speaker or a display output such as a pop-up on a monitor.

Figure 7:
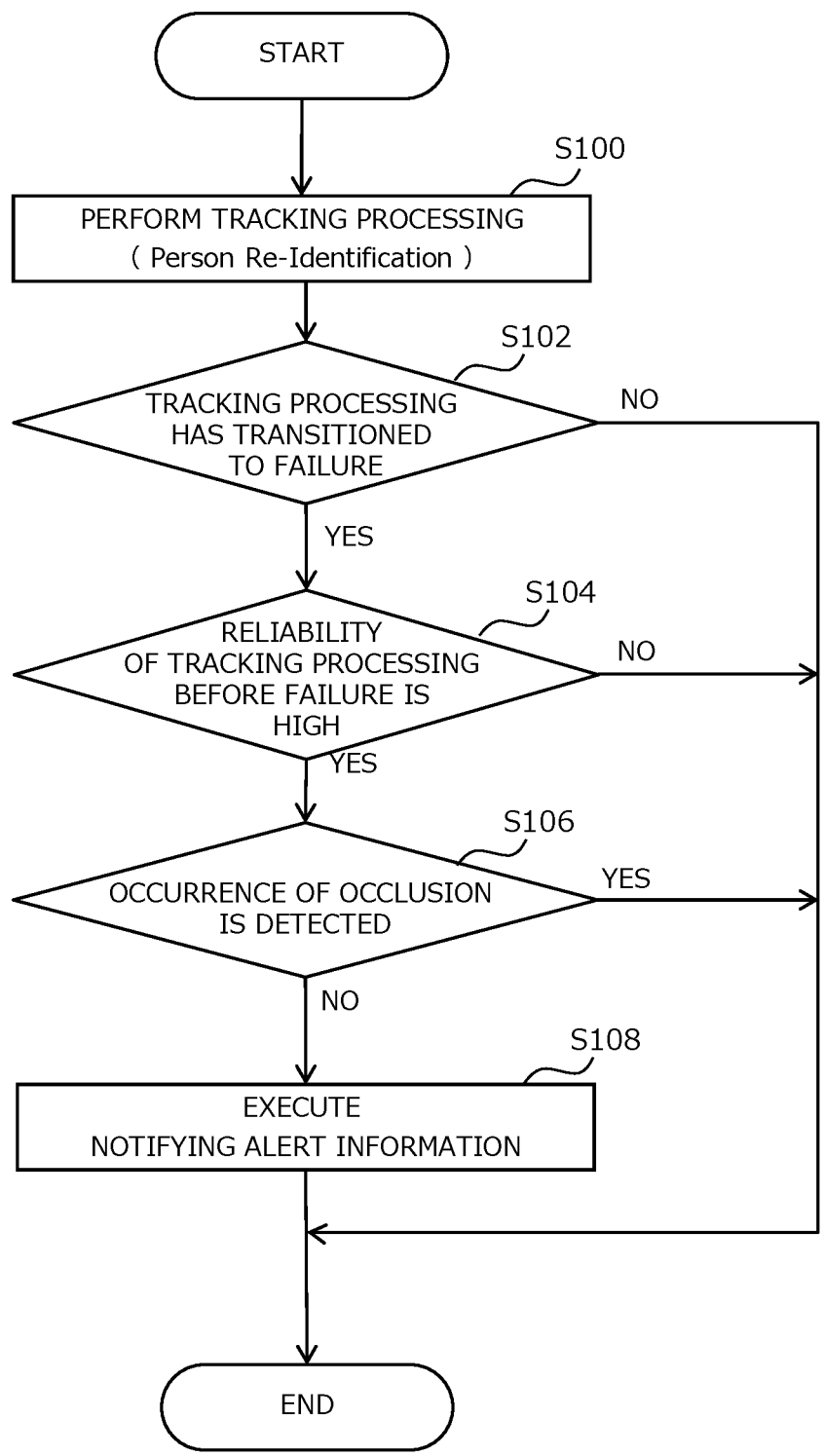
FIG. 7 is a flowchart showing a routine of processing by the security system.

3. Specific Operation Example of Identification of Suspicious Behavior by Security System Next, an operation example of a process of specifying a suspicious behavior by the security system 100 according to the embodiment will be described with reference to FIG. 7. The security system 100 is a system that outputs an alert for a suspicious behavior of a person when the suspicious behavior of the person is included in camera images IMG of one or more surveillance cameras 2. FIG. 7 is a flowchart showing a routine of processing by the security system. The routine shown in FIG. 7 is executed by the processor 20 of the management server 10 executing the security program 32. This flowchart also represents a portion of a security method according to an embodiment of the present disclosure.

In step S100 of the routine illustrated in FIG. 7, the tracking processing is performed on each person image included in the camera images captured by one or more surveillance cameras 2. In the next step S102, it is determined whether there is a person image for which the tracking processing in step S100 has transitioned to failure. As a result, in a case where establishment of the determination is not recognized, the processing of this routine is terminated, and in a case where establishment of the determination is recognized, the processing proceeds to step S104.

In step S104, in the reliability determination processing, it is determined whether the reliability of the tracking processing before the failure is high. In the reliability determination processing, typically, it is determined whether the duration time Tc of the tracking processing before failure is greater than the predetermined time Tth. As a result, when establishment of the determination is recognized, the processing proceeds to step S106. On the other hand, in a case where establishment of the determination is not recognized, the processing of this routine is terminated. As a result, execution of the suspicious behavior determination processing in the subsequent steps is prohibited.

In step S106, it is determined whether the occurrence of occlusion is detected in the occlusion detection processing. As a result, in a case where establishment of the determination is recognized, the processing of this routine is terminated. As a result, execution of the suspicious behavior determination process in the subsequent steps is prohibited. On the other hand, when the establishment of the determination is not recognized, it is determined that the suspicious behavior is included in the camera image, and the process proceeds to step S108. In step S108, the notification processing of notifying alert information from the output device 4 is executed.

As is clear from the above description, according to the security system 100 according to the embodiment, it is possible to identify the suspicious behavior of changing the appearance from the camera image. As a result, the alert information can be notified from the output device 4, which is useful for crime prevention.

4. Modified Example

The following modifications may be applied to the security system 100 according to the embodiment.

4-1. Suspicious Behavior Determination Processing

In the suspicious behavior determination processing, conditions based on the occlusion determination processing and the reliability determination processing are not essential. That is, in the suspicious behavior determination processing, when establishment is recognized in step S102, the processing may proceed to step S108 without performing the processing of step S104 and the processing of step S106.

4-2. Tracking Processing

The method of the tracking processing is not limited as long as it is possible to identify a person between camera images in time series.

What is claimed is:

1. A security system that monitors a behavior of a person included in a plurality of camera images captured continuously in time series by a surveillance camera, the security system comprising:
    a memory configured to store the plurality of camera images; and
    a processor configured to process the plurality of camera images stored in the memory,
    wherein the processor is configured to execute a process that includes:
        tracking by detecting a person region of the person in each of the plurality of camera images and identifying the person included in the plurality of camera images in time series based on person image data included in the person region; and
        suspicious behavior determination in which it is determined that the person has a suspicious behavior in a case where identification of the person by the tracking fails to identify the person in the middle of the tracking of the plurality of camera images after identifying the person during the tracking of earlier camera images of the plurality of camera images, the earlier camera images having been captured before the camera images in the middle of the tracking.

2. The security system according to claim 1, wherein the plurality of camera images includes a first camera image and a second camera image captured subsequently to the first camera image,
    template image data including the person image data of the person region for the person of the first camera image is stored in the memory, and
    the tracking identifies the person in the second camera image by comparing person image data included in the person region of the second camera image with the template image data using a neural network model.

3. The security system according to claim 1,
    wherein the processor is configured to prohibit execution of the suspicious behavior determination for the person region when occlusion occurs in which an object overlaps a foreground side of the person in the person region.

4. The security system according to claim 1,
    wherein the processor is configured to prohibit execution of the suspicious behavior determination when (i) the identification of the person by the tracking fails to identify the person in the middle of the tracking of the plurality of camera images and (ii) the identification of the person by the tracking has not been continued for a predetermined time before the tracking fails to identify the person in the middle of the tracking.

5. The security system according to claim 1,
    wherein the processor is configured to output notifying alert information through an output device when it is determined that the person has the suspicious behavior.

6. A security method in which a computer performs monitoring of a behavior of a person included in a plurality of camera images captured continuously in time series by a surveillance camera, the security method being executed by the computer and comprising:
    detecting a person region of the person in each of the plurality of camera images;
    tracking the person by identifying the person included in the plurality of camera images in time series based on person image data included in the person region; and
    determining that the person has a suspicious behavior when the identification of the person by the tracking fails to identify the person in the middle of the tracking of the plurality of camera images after identifying the person during the tracking of earlier camera images of the plurality of camera images, the earlier camera images having been captured before the camera images in the middle of the tracking.

7. A non-transitory computer-readable storage medium storing a security program that causes a computer to execute monitoring of behavior of a person included in a plurality of camera images continuously captured in time series by a surveillance camera, the security program causing the computer to execute a process that includes:

detecting a person region of the person in each of the plurality of camera images;

tracking the person by identifying the person included in the plurality of camera images in time series based on person image data included in the person region; and determining that the person has a suspicious behavior when the identification of the person by the tracking fails to identify the person in the middle of the tracking of the plurality of camera images after identifying the person during the tracking of earlier camera images of the plurality of camera images, the earlier camera images having been captured before the camera images in the middle of the tracking.

8. The security method according to claim 6, wherein the plurality of camera images includes a first camera image and a second camera image captured subsequently to the first camera image, template image data including the person image data of the person region for the person of the first camera image is stored in a memory, and the tracking identifies the person in the second camera image by comparing person image data included in the person region of the second camera image with the template image data using a neural network model.

9. The security method according to claim 6, wherein the computer prohibits execution of the determining that the person has the suspicious behavior for the person region when occlusion occurs in which an object overlaps a foreground side of the person in the person region.

10. The security method according to claim 6, wherein the computer prohibits execution of the determining that the person has the suspicious behavior when (i) the identification of the person by the tracking fails to identify the person in the middle of the tracking of the plurality of camera images and (ii) the identification of the person by the tracking has not been continued for a predetermined time before the tracking fails to identify the person in the middle of the tracking.

11. The security method according to claim 6, wherein the computer outputs notifying alert information through an output device when it is determined that the person has the suspicious behavior.

12. The non-transitory computer readable storage medium according to claim 7, wherein the plurality of camera images includes a first camera image and a second camera image captured subsequently to the first camera image, the security program causes template image data including the person image data of the person region for the person of the first camera image to be stored in a memory, and the tracking identifies the person in the second camera image by comparing person image data included in the person region of the second camera image with the template image data using a neural network model.

13. The non-transitory computer readable storage medium according to claim 7, wherein the security program causes the computer to prohibit execution of the determining that the person has the suspicious behavior for the person region when occlusion occurs in which an object overlaps a foreground side of the person in the person region.

14. The non-transitory computer readable storage medium according to claim 7, wherein the security program causes the computer to prohibit execution of the determining that the person has the suspicious behavior when (i) the identification of the person by the tracking fails to identify the person in the middle of the tracking of the plurality of camera images and (ii) the identification of the person by the tracking has not been continued for a predetermined time before the tracking fails to identify the person in the middle of the tracking.

15. The non-transitory computer readable storage medium according to claim 7, wherein the security program causes the computer to output notifying alert information through an output device when it is determined that the person has the suspicious behavior.

* * * * *